(12) United States Patent
Glasser et al.

(10) Patent No.: US 10,751,683 B2
(45) Date of Patent: Aug. 25, 2020

(54) FIXED BED REACTOR

(71) Applicant: UNISA, Pretoria (ZA)

(72) Inventors: David Glasser, Florida (ZA); Xiaojun Lu, Florida (ZA); Diane Hildebrandt, Florida (ZA)

(73) Assignee: UNISA, Pretoria (ZA)

( * ) Notice: Subject to any disclaimer, the term of this patent is extended or adjusted under 35 U.S.C. 154(b) by 0 days.

(21) Appl. No.: 15/528,824

(22) PCT Filed: Nov. 24, 2015

(86) PCT No.: PCT/IB2015/059069
§ 371 (c)(1),
(2) Date: May 23, 2017

(87) PCT Pub. No.: WO2016/083989
PCT Pub. Date: Jun. 2, 2016

(65) Prior Publication Data
US 2017/0312723 A1     Nov. 2, 2017

(30) Foreign Application Priority Data
Nov. 24, 2014   (ZA) ................................ 2014/08600

(51) Int. Cl.
*B01J 8/06*     (2006.01)
*F28D 15/02*    (2006.01)
*B01J 8/02*     (2006.01)
*C10G 2/00*     (2006.01)

(52) U.S. Cl.
CPC ............ *B01J 8/067* (2013.01); *B01J 8/0285* (2013.01); *B01J 8/065* (2013.01); *C10G 2/341* (2013.01); *F28D 15/02* (2013.01); *B01J 2208/0053* (2013.01); *B01J 2208/00132* (2013.01); *B01J 2208/00194* (2013.01);
(Continued)

(58) Field of Classification Search
CPC .. B01J 8/067; B01J 8/065; B01J 2208/00123; B01J 2208/00132; B01J 2208/00212; B01J 2208/00238; C10G 2/341
See application file for complete search history.

(56) References Cited

U.S. PATENT DOCUMENTS 1,900,382 A  *  3/1933  Jaeger ..................... B01J 8/067
                                                   165/104.14
2,078,947 A  *  5/1937  Houdry et al. ........ A01B 33/02
                                                   422/200
(Continued)

FOREIGN PATENT DOCUMENTS

WO      03057361      7/2003

OTHER PUBLICATIONS

Written opinion of PCT/IB2015/059069 Completed Feb. 26, 2016; dated Mar. 17, 2016 5 pages.
(Continued)

*Primary Examiner* — Lessanework Seifu
(74) *Attorney, Agent, or Firm* — The Roy Gross Law Firm, LLC; Roy Gross

(57) ABSTRACT

A reactor, which includes a reactor body and two reactor ends sealing the ends of the reactor body, a plurality of reactor tubes extending inside the reactor body at least partially between the reactor ends, and at least one heat pipe disposed inside at least one of the reactor tubes.

10 Claims, 5 Drawing Sheets

(52) U.S. Cl.
CPC ......... *B01J 2208/00212* (2013.01); *B01J 2208/00256* (2013.01); *B01J 2208/065* (2013.01)

(56) References Cited

U.S. PATENT DOCUMENTS

| | | | |
|---|---|---|---|
| 4,315,893 A * | 2/1982 | McCallister | B01J 8/1836 252/373 |
| 4,474,230 A * | 10/1984 | McCallister | B01J 8/1836 165/104.21 |
| 4,594,227 A | 6/1986 | Ohsaki et al. | |
| 4,767,791 A | 8/1988 | Nakajima et al. | |
| 5,069,169 A | 12/1991 | Maruko | |
| 2004/0102530 A1 | 5/2004 | Borsa et al. | |
| 2010/0240780 A1 | 9/2010 | Holcombe | |
| 2010/0260651 A1 | 10/2010 | Lehr et al. | |
| 2014/0147345 A1 | 5/2014 | Banister | |

OTHER PUBLICATIONS

International Search Report of PCT/IB2015/059069 Completed Feb. 26, 2016; dated Mar. 17, 2016 2 pages.

* cited by examiner

FIXED BED REACTOR

FIELD OF THE INVENTION

This invention relates to a fixed bed reactor.

BACKGROUND OF THE INVENTION

The Fischer Tropsch reaction converts syngas (a mixture of CO, $H_2$ and $CO_2$) to hydrocarbons over a solid catalyst. The Fischer Tropsch reaction is extremely exothermic. The Fischer Tropsch reaction is unusual in that many products are produced, including alkanes, alkenes and alcohols, and a wide range of carbon numbers of these hydrocarbons. The product distribution is described by the Schultz Flory distribution, or modifications of this, including the 2 alpha models. Depending on the operating temperature, the products will comprise mainly vapour phase products (T>300° C.) or alternatively a mix of vapour and liquids products (T<250° C.).

The chain length of products includes methane (C1) and ranges to oils and waxes (C>100). Thus the product covers a wide range of boiling points. In particular, certain products, such as methane, are mainly in the gas phase while the heavier products (waxes) are mainly in the liquid phase.

The reaction is often performed in a fixed bed reactor. In many situations, the catalyst is placed in the tube side. The flow, temperature profile and heat transfer in the tube is very complicated. In particular there is three phase flow including solid (catalyst), liquids (heavy hydrocarbons) and vapour/gas (light hydrocarbons and syngas).

The temperature profile in the tube limits the reaction rate that can be obtained in the reactor. Furthermore this limits the productivity of the tube and thus the fixed bed reactor. The maximum temperature is often found close to the inlet of the tube, and the operating temperature (often determined by the temperature of the steam in the shell) is set so as to ensure that this maximum temperature is within certain ranges.

If the reactor temperature is increased, this leads firstly to an increase in production of lighter (undesirable) components and in particular methane and $CO_2$, and at even higher temperatures, deactivation of the catalyst.

Further the local reaction rate decreases as the average radial temperature and reactant concentrations decreases. This leads to lower average production rates in the catalyst bed and thus the reactor.

The inventor is aware of fixed bed reactor designs. Existing reactor designs uses an outer shell as main heat extraction mechanism with a plurality of tubes disposed longitudinally inside the reactor to enhance heat exchange between reactants and the fixed bed.

Heat generated in the tubes is conducted to the fixed bed and the heat is then removed from the fixed bed through the outer shell of the reactor.

However, often the heat exchange designs of the reactors are complex due to the fact that the heat is only removed from the shell of the reactor. This leads to hot spots inside the reactor. Various designs have been focusing on the effective conduction of heat in a radial direction towards the outer shell of the reactor, however the effective heat conduction remains a shortcoming in many reactors.

The present invention aims to address the problem of heat concentrations inside the fixed bed reactors.

SUMMARY OF THE INVENTION

According to a first aspect of the invention, there is provided a reactor, which includes a reactor body and two reactor ends sealing the ends of the reactor body;

a plurality of reactor tubes extending inside the reactor body at least partially between the reactor ends; and at least one heat pipe disposed inside at least one of the reactor tubes.

The reactor may be a fixed bed reactor.

The reactor body may be oriented in an upright condition and the reactor tubes may extend vertically inside the reactor body.

The reactor body may be tubular and defined by a tubular shell.

At least one of the reactor ends may be dome shaped.

The tubular shell may be a walled shell with a first heat removal medium (FHRM) disposed therein.

The fixed bed reactor may include a cooling plant arranged to cool the first heat removal medium, the first heat removal medium being circulated in the double walled shell and the cooling plant.

The at least one heat pipe may comprise
a metallic elongated hermetically sealed tube;
a bi-phase condensative working fluid disposed inside the tube, the working fluid defining a second heat removal medium (SHRM).

The heat pipe may have a heat-receiving portion disposed in a portion of the reactor body from which heat is to be removed.

The at least one heat pipe may protrude beyond the at least one reactor tube. In particular the at least one heat pipe may protrude beyond the top end of the at least one reactor tube.

The heat pipe may have a heat-dissipating portion along the heat pipe length disposed in a portion of the reactor body in which heat can be dissipated.

The heat pipe may include fins, arranged around the heat pipe.

The at least one heat pipe may extend only partially along the length of the at least one reactor tube. In particular, the at least one heat pipe may only extend partially towards the bottom end of the at least one reactor tube.

The bi-phase condensable working fluid may comprise either a single component or a multi-component mixture.

The multi-component mixture of liquids may comprise a mixture of Fischer-Tropsch products in which a variable boiling and condensing point of the mixture may be obtained by suitable mixing of the components.

The composition of the multi component mixture may be designed so that the temperature profile in the tube is controlled to achieve a higher average reaction rate and to extend the catalyst life in the Fischer-Tropsch reactor.

The invention will now be described by way of a non-limiting example only, with reference to the following drawing.

DRAWINGS

EMBODIMENT OF THE INVENTION

Figure 1:
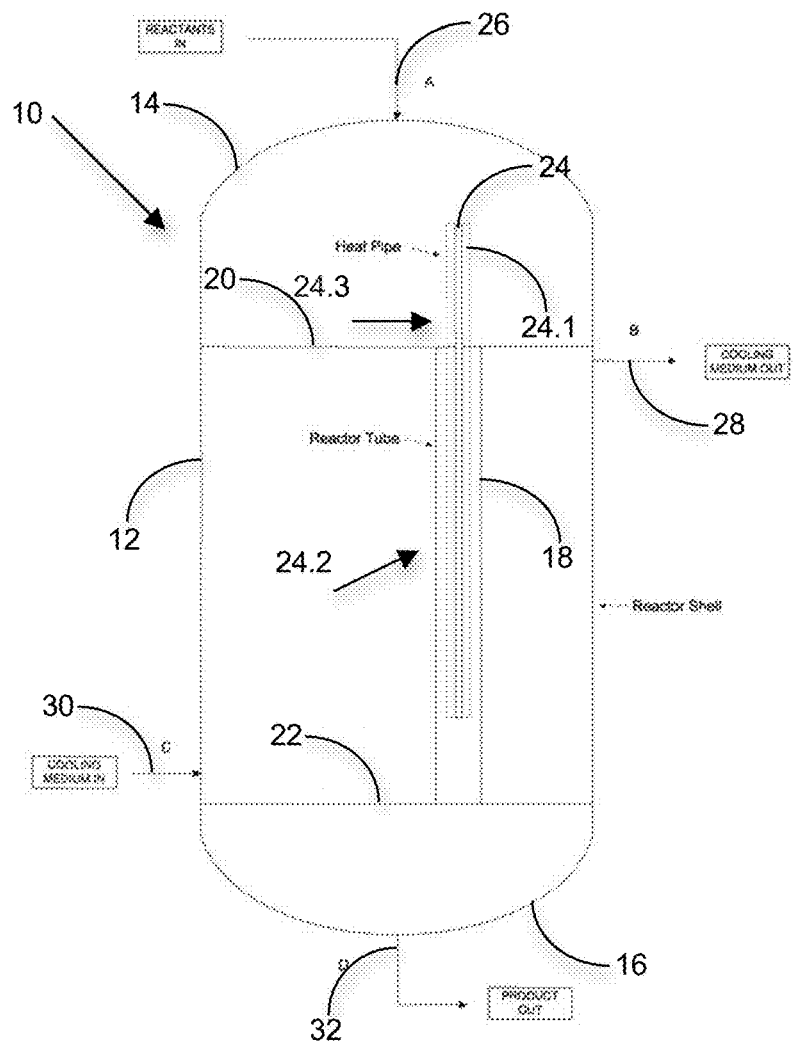
FIG. 1 shows a side section of a reactor in accordance with one aspect of the invention.
Figure 2:
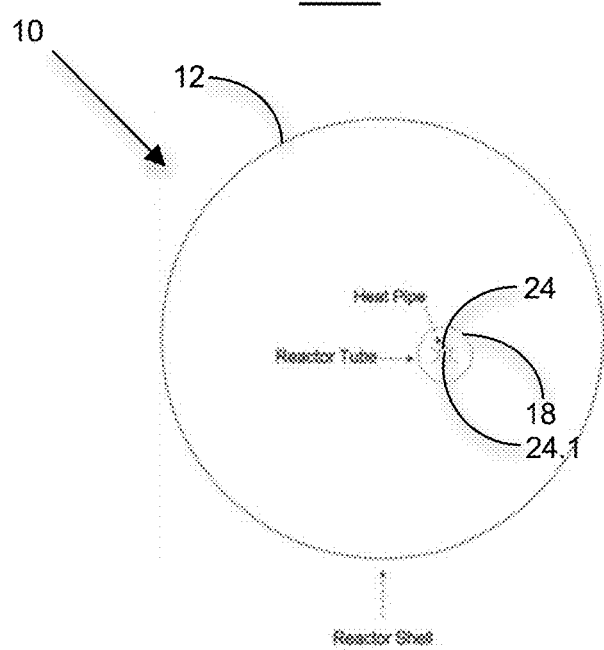
FIG. 2 shows a top section of the reactor of FIG. 1.

In FIG. 1, a fixed bed reactor 10 in accordance with one aspect of the invention, is shown.

The fixed bed reactor 10 includes an upright tubular reactor body defined by a tubular shell wall 12, two domed ends (a reactor top section) 14 and (a reactor bottom section) 16, at the ends of the tubular shell. As can be seen, the shell 12 is positioned in a substantially upright orientation.

The fixed bed reactor 10 includes a plurality of reactor tubes 18 (of which only one is shown) extending vertically inside the reactor body between the domed ends 14, 16. The reactor includes two baffles 20, 22 to which the reactor tubes 18 are mounted.

A plurality of hermetically sealed heat pipes 24 (only one shown) are disposed inside at least some of the plurality of reactor tubes 18, one heat pipe per reactor tube. The heat pipes 24 include radially arranged, longitudinally extending fins 24.1.

As can be seen in FIG. 1, the heat pipes 24 protrude beyond the top end of the reactor tubes 18 and extend only partially towards the bottom ends of the reactor tubes 18.

The tubular shell 12 in this example is a double walled shell with a first heat removal medium (not shown) disposed therein. The fixed bed reactor includes a cooling plant (not shown) arranged to cool the first heat removal medium when the first heat removal medium is circulated in the double walled shell and the cooling plant.

The heat pipes 24 include a second heat removal medium.

In use, the reactor is designed for highly exothermic reactions, such as Fischer-Tropsch Reactions.

The reactor tubes 18 are loaded with catalyst to convert gas phase reactants to products. Heat is generated by the reaction(s) in the catalyst bed. Each heat pipe 24 can be divided into two sections namely a cooling zone 24.2 and a heating zone 24.3. The section that is merged in the catalyst bed (inside the reactor tube 18) is called cooling zone 24.2 and the section that sticks out from the reactor tube 18 is called heating zone 24.3. The heat pipe 24 has radially extending heat fins running longitudinally along the length of the heat pipe.

In use, gas phase reactants are fed from the top of the reactor (26 in the drawing) at low temperature (temperature ranges between 25° C. to 40° C.) and heated up by the heating zone 24.3 of the heat pipe 24 to the reaction temperature. Heated up gas enters the catalyst bed in the reactor tube to commence reaction. When reaction takes place in the catalyst bed, heat generated by reaction is removed in two paths, namely from the catalyst bed to the first heat removal medium in the shell and from the catalyst bed to the second heat removal medium in the heat pipe. The first heat removal medium (FHRM) is heated up and vaporized in the shell. The vapour phase of the FHRM is discharged from the top side of the shell 28 for heat recovery. The FHRM is condensed after heat recovery by the cooling plant and sent back to the reactor from the bottom side of the reactor shell 30. The second heat removal medium (SHRM) in the cooling zone of the heat pipe is vaporized by the heat from the reaction and rise to the heating zone of the heat pipe. The vapour phase of the SHRM is condensed by giving heat to the reactant gas in the top section 24.3 of the reactor 10. The condensed SHRM flows down to the cooling zone 24.2 of the heat tube and then is vaporized again by the heat from reaction. The products produced with Fischer-Tropsch reaction as well as the unconverted reactants are discharged from the bottom section of the reactor at 32.

Figure 3:
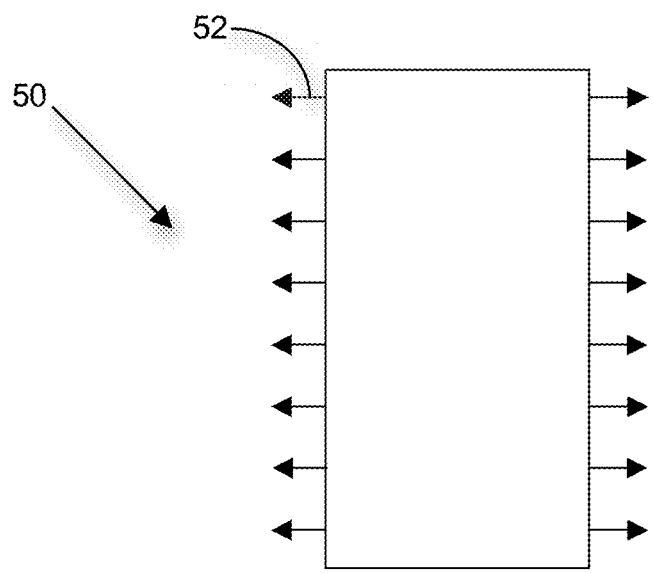
FIG. 3 shows a schematic diagram of the radial heat flux in a standard heatpipe during a Fischer-Tropsch reaction.

In FIG. 3 a schematic diagram of the radial heat flux in a standard heatpipe 50 during a Fischer-Tropsch reaction, is shown. As indicated by arrow 52, heat generated by the reaction is transferred via the reactor tube wall only.

Figure 4:
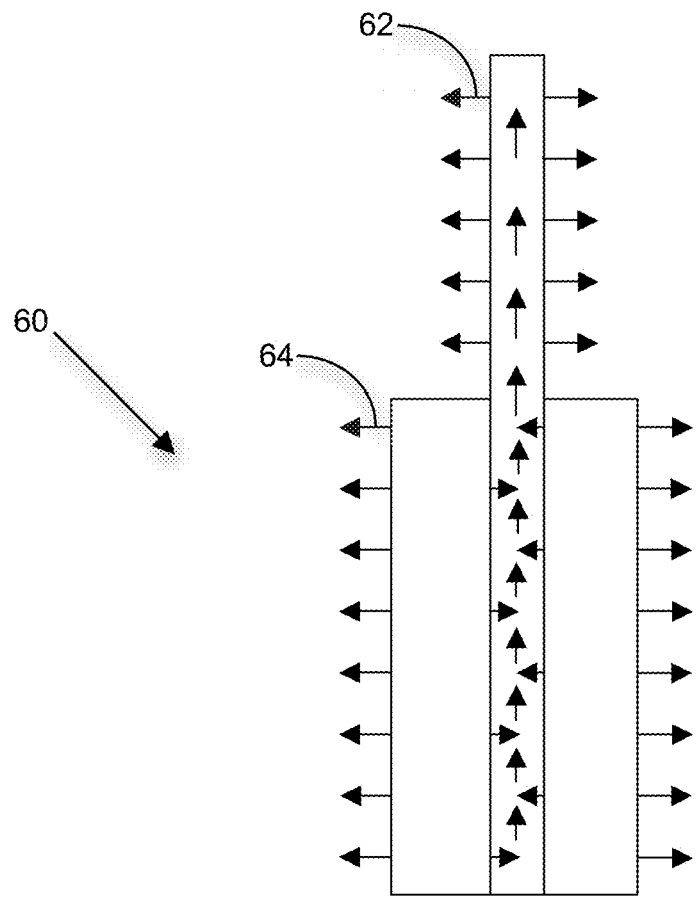
FIG. 4 shows a schematic diagram of the heat flux in a heatpipe of the fixed bed Fischer-Tropsch reactor of FIG. 1.

In FIG. 4 a schematic diagram of the heat flux in a heatpipe 60 of the fixed bed Fischer-Tropsch reactor in accordance with the present invention is shown. An additional heat transfer route is created which allows the heat generated by the reaction to transfer both through the reactor tube wall as indicated by arrow 62 as well as through the heat pipe as indicated by arrow 64 so that the temperature rise in the catalyst bed could be suppressed effectively.

Figure 5:
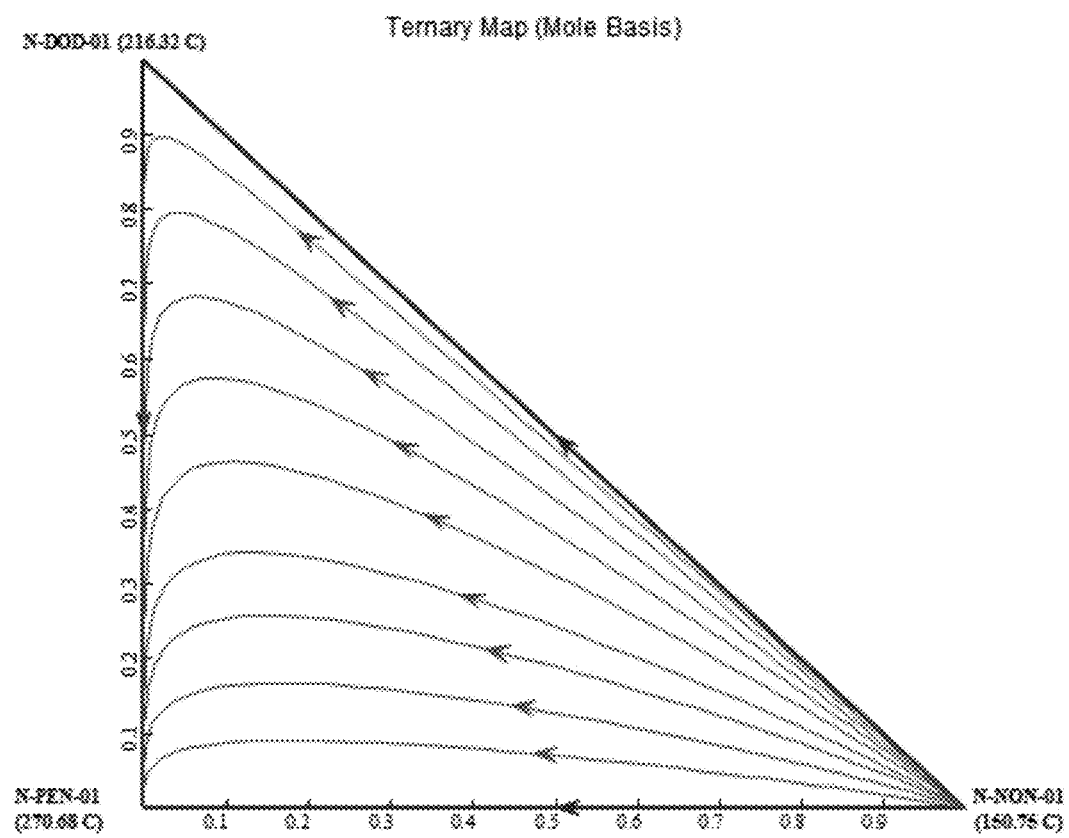
FIG. 5 shows a residue curve for a ternary mixture with normal alkanes of carbon numbers of 9, 12, and 15.

FIG. 5 shows a residue curve for a ternary mixture with normal alkanes of carbon numbers of 9, 12, and 15. The purpose of the SHRM is to have a heat pipe temperature that is tuned to match or to be close to the desired working temperature range of the catalyst bed. Examples: single component could be, but not limited to, water working between the temperature range of 190 to 250° C. with pressure of 1.254 to 3.973 MPa; a ternary mixture may be made of, but not limited to, normal alkanes of carbon numbers of 9, 12, and 15 to give a temperature range from 150 to 270° C. at atmospheric pressure. There are a very large number of other possibilities, which can be used as SHRM in order to satisfy the specific needs of the user. As seen in FIG. 5, the temperature of the heat pipe is tuneable within a temperature range of 150 to 270° C. by adjusting the composition of these three components.

Figure 7:
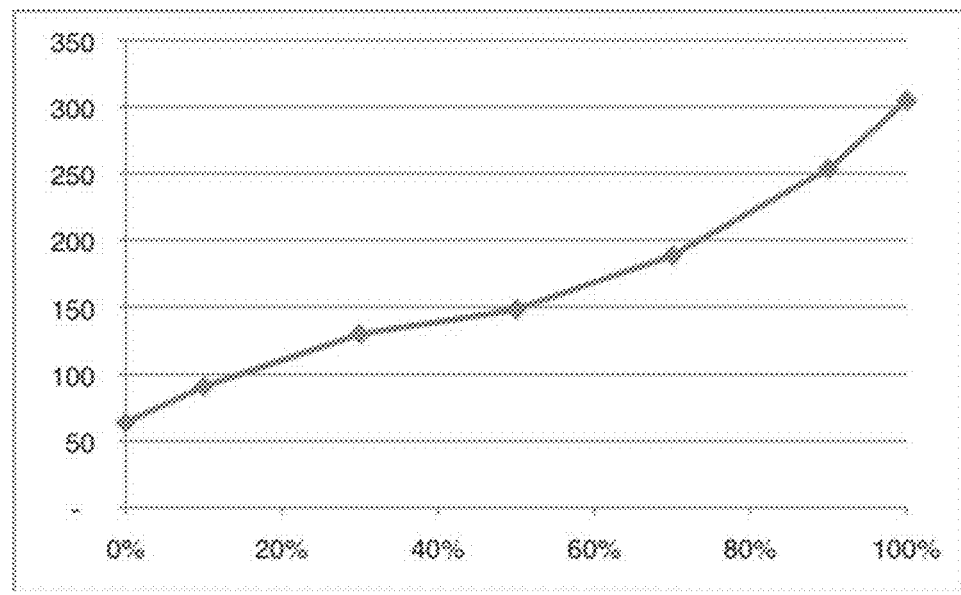
FIG. 7 shows the boiling curve for oil in FIG. 6, with the temperature in ° C. versus mass % boiled off at atmospheric pressure.

In FIG. 7 it can readily be seen that the steeper part of the boiling curve occurs where there is a smaller amount of the material; that is at the beginning and the end of the curve. Thus, the shape of the curve can be changed by changing the composition of the mixture. For instance if this boiling range is considered too large, namely 60-300° C., one can narrow its range say to 150-250° C. by cutting out the appropriate amounts of the low and high boiling fractions. Furthermore the shape of the curve can be changed by changing the relative proportions of the different fractions.

The rate of heat absorbed at each point in the reactor is proportional to the temperature difference between the reactor contents and the heat pipe at that point. In this way we can design the temperature profile in the heat pipe to take out the heat from the reactor where it is most needed. In this way it is possible to use the multi-component heat pipe described in this patent to better control the reactor temperature.

Figure 8:
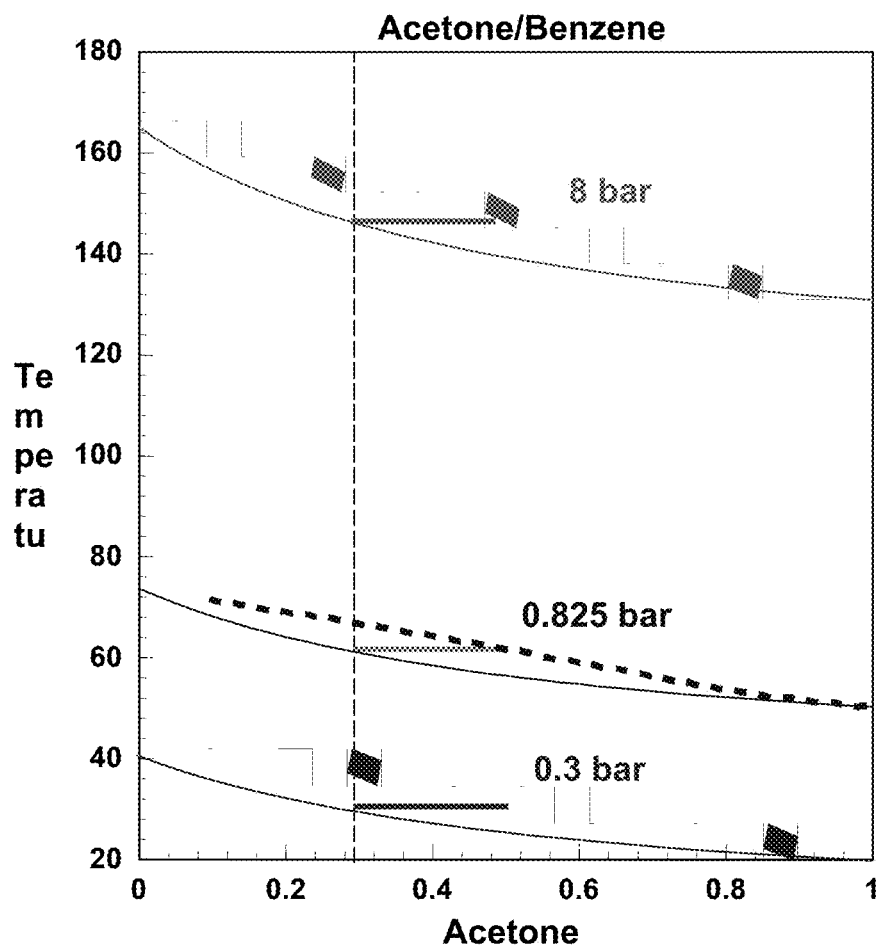
FIG. 8 shows the temperature composition curves for the Acetone/Benzene system at different overall pressures.

Another variable one can use to control the process is the pressure. The pressure that the heat pipe operates at can be controlled by the filling of the tube; that is by the relative amount of liquid one puts in the volume of the inside of the heat pipe. The more liquid one puts in the heat pipe the higher the total pressure. Thus it can be seen in FIG. 8 the effect of pressure on the temperature range that can be operated at. Thus a heat pipe with a mixture of Acetone and Benzene at 8 bar pressure could operate over a range 135-165° C.

Figure 9:
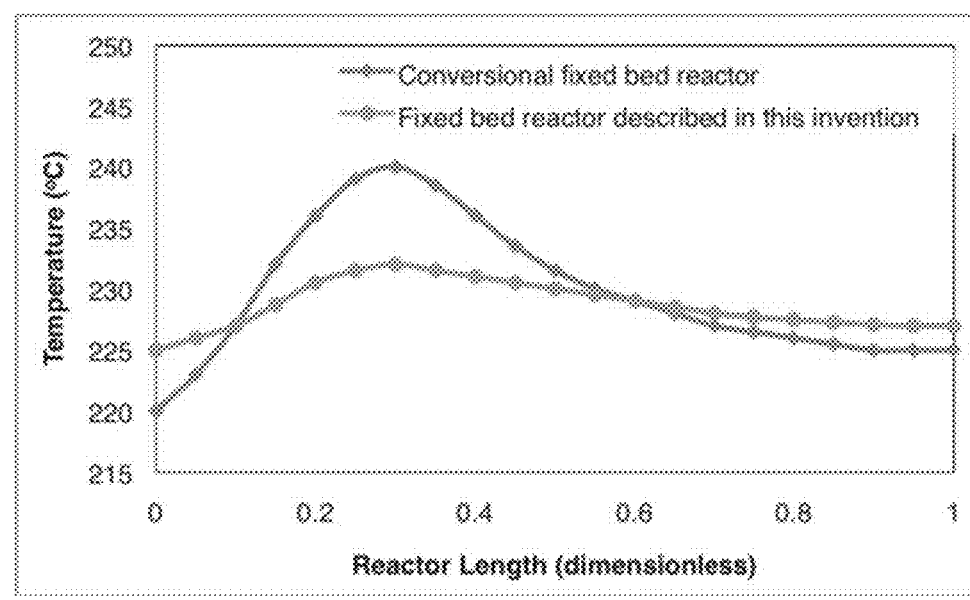
FIG. 9 shows the reactor temperature versus length for the fixed bed reactor of FIG. 1 against a conventional fixed bed reactor.

In FIG. 9 it can be seen how the heat pipe in the reactor, the temperature profile in the catalyst bed can be flattened, so that the maximum temperature in the catalyst bed can be decreased, thus extending the life of the catalyst, while increasing the average temperature, thereby increasing the average reaction rate which will increase the overall productivity.

Figure 6:
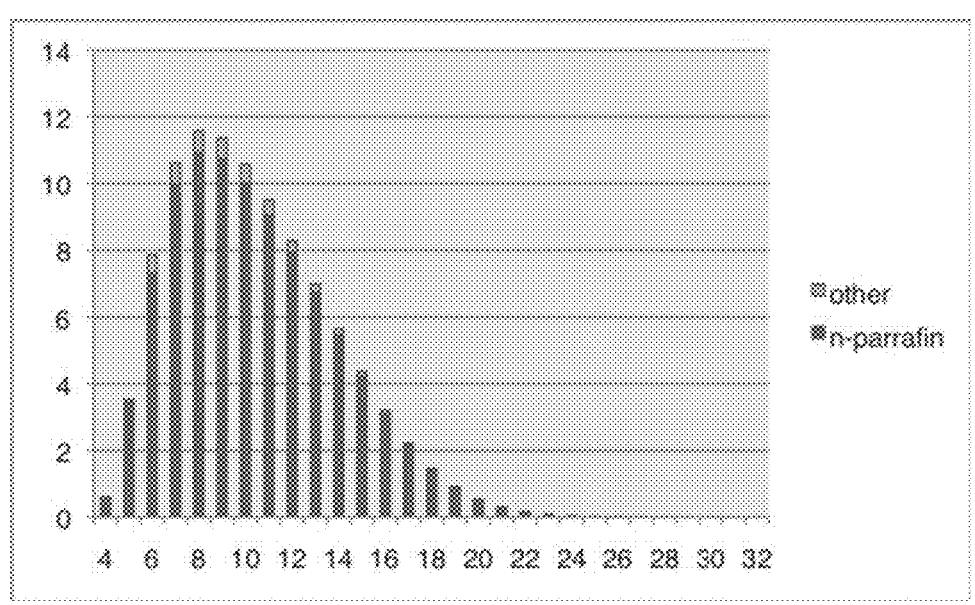
FIG. 6 shows the composition of an FT oil, with the mass percent of each size fraction versus the carbon number.

The multi-component mixture of liquids may comprise a mixture of Fischer-Tropsch products in which a variable boiling and condensing point of the mixture may be obtained by suitable mixing of the components. For instance an FT oil that was collected had the composition shown in FIG. 5 and its boiling point curve is shown in FIG. 6.

The inventor is of the opinion that the invention as described provides a new fixed bed reactor which will be of particular use in the effective heat exchange in reactors which are prone to heat build up.

The invention claimed is:

1. A reactor comprising:
    an upright reactor body and two reactor ends sealing the ends of the reactor body, in which the reactor body is defined by a double walled tubular shell with a first heat removal medium (FHRM) disposed within the double walled tubular shell, the FHRM being heated up and vaporized in the double walled tubular shell, with the FHRM discharged from the top of the shell for heat recovery;
    a plurality of reactor tubes extending vertically inside the reactor body at least partially between the reactor ends for receiving a catalyst; and
    at least one heat pipe disposed vertically inside at least one of the reactor tubes, in which the at least one heat pipe comprises an elongated hermetically sealed tube and a bi-phase condensative working fluid disposed inside the elongated hermetically sealed tube defining a second heat removal medium (SHRM), in which the bi-phase condensative working fluid comprises a multi-component mixture tuned to achieve the desired working temperature range of the catalyst bed over the length of the reactor tube,
    the at least one heat pipe extending at least partially along the length of the at least one reactor tube and protruding beyond the at least at least one reactor tube, the at least one heat pipe comprising:
        a cooling zone immerged in a catalyst bed to remove heat from the catalyst bed over the length of the reactor tube; and
        a heating zone exposed to reactant gas to pre-heat a reactant gas before entering the catalyst bed.

2. The reactor of claim 1, which is a fixed bed reactor.

3. The reactor of claim 2, wherein the reactor body is oriented in an upright condition and wherein the reactor tubes extend vertically inside the reactor body.

4. The reactor of claim 3, wherein at least one of the reactor ends is dome shaped.

5. The reactor of claim 4, wherein the fixed bed reactor includes a cooling plant arranged to cool the first heat removal medium, the first heat removal medium being circulated in the walled shell and the cooling plant.

6. The reactor of claim 1, wherein the heat pipe includes radially arranged, longitudinally extending fins arranged around the heat pipe.

7. The reactor of claim 1, wherein the multi-component mixture of liquids comprises a mixture of Fischer-Tropsch products in which a variable boiling and condensing point of the mixture is obtained by suitable mixing of the components to achieve a heat pipe temperature that is tuned to achieve the desired working temperature range of the catalyst bed.

8. The reactor of claim 7, wherein the composition of the multi component mixture is designed so that the temperature profile in the tube is controlled to achieve a higher average reaction rate in the reactor by selecting the multi-component mixture to decrease the maximum temperature in the reactor and increasing the average temperature in the reactor.

9. The reactor of claim 8, wherein the multi component mixture is a ternary mixture of normal alkanes of carbon numbers of 9, 12, 15.

10. The reactor of claim 9, wherein the multi component mixture is tuned to provide a working temperature range from 150° C. to 270° C., by adjusting the composition of the three components.

* * * * *